(No Model.) 2 Sheets—Sheet 1.
C. A. & J. SCHNEIBLE.
ART OF AND APPARATUS FOR CARBONATING LIQUIDS.
No. 484,901. Patented Oct. 25, 1892.
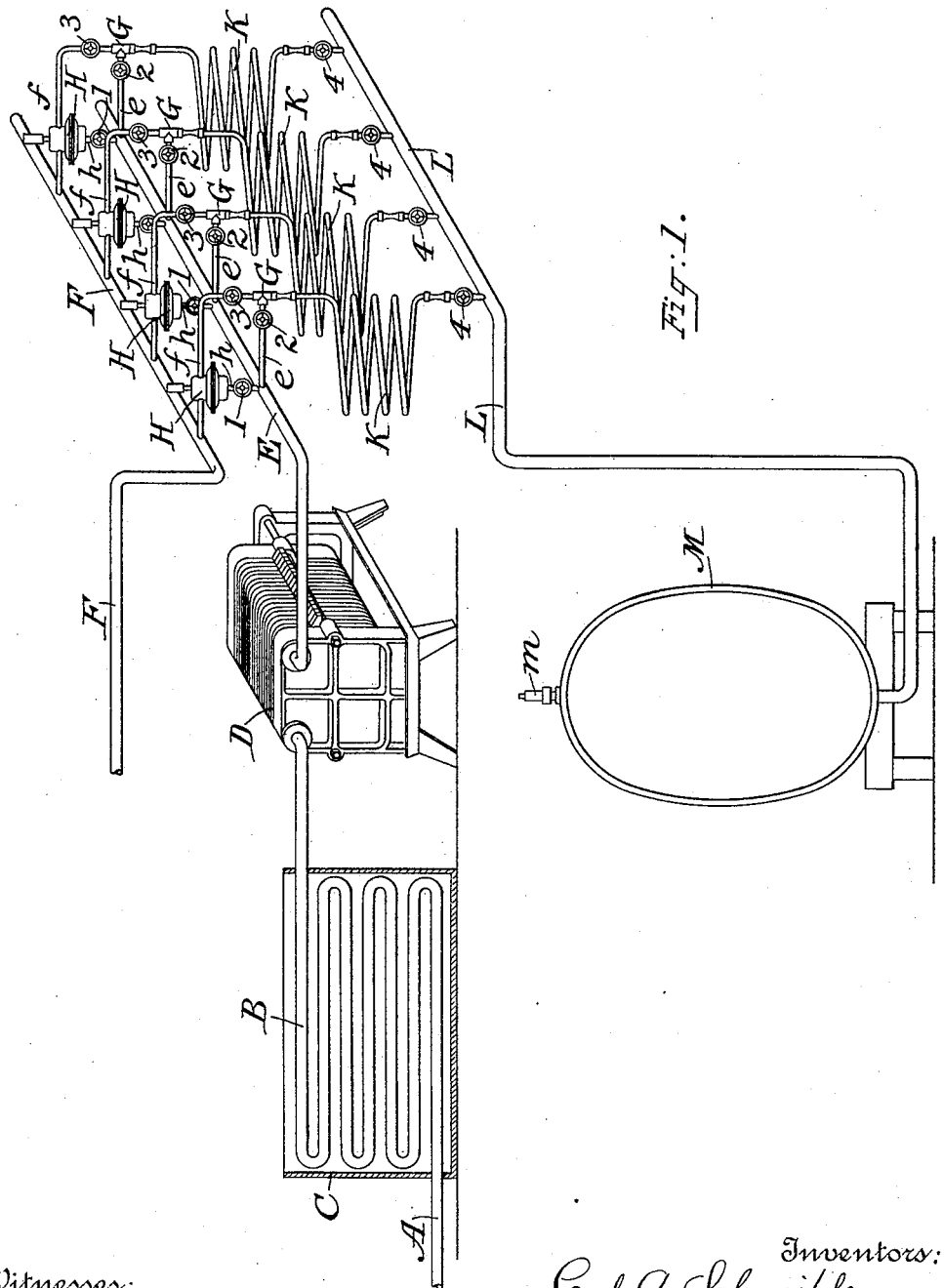

(No Model.) 2 Sheets—Sheet 2.
C. A. & J. SCHNEIBLE.
ART OF AND APPARATUS FOR CARBONATING LIQUIDS.
No. 484,901. Patented Oct. 25, 1892.
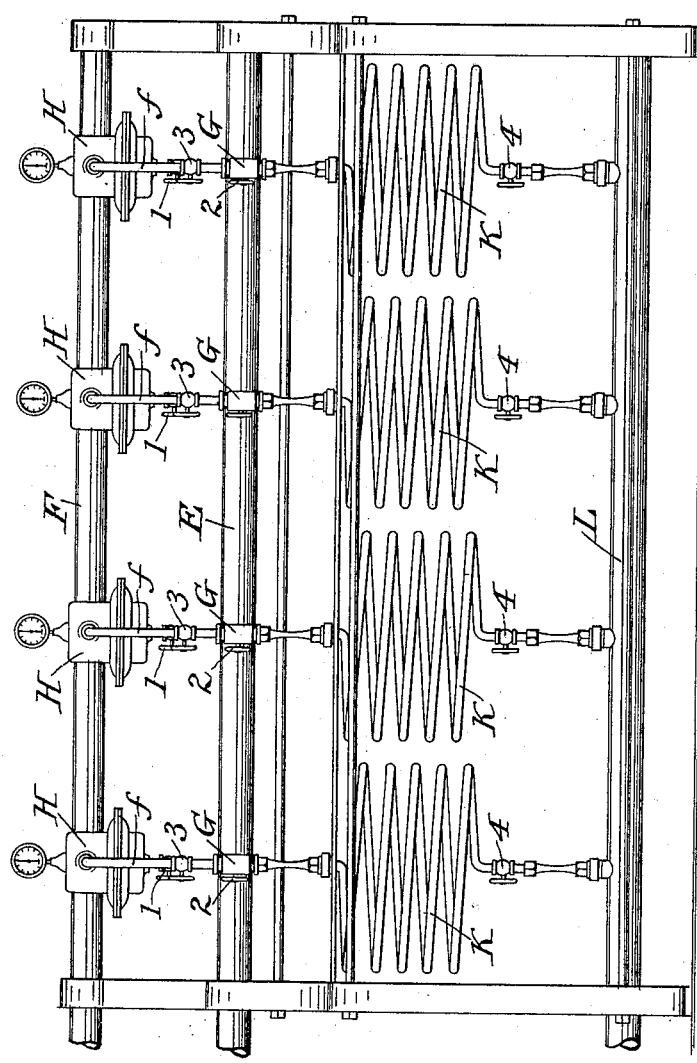
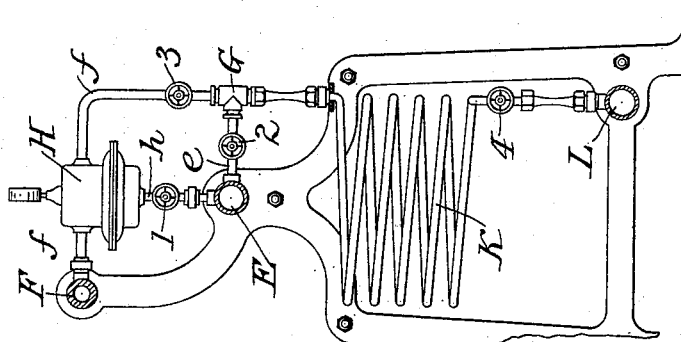
Witnesses:
Inventors:
Carl A. Schneible
and Joseph Schneible
by William B. Greeley
Atty

UNITED STATES PATENT OFFICE.

CARL A. SCHNEIBLE, OF NEW YORK, AND JOSEPH SCHNEIBLE, OF BROOKLYN, NEW YORK.

ART OF AND APPARATUS FOR CARBONATING LIQUIDS.

SPECIFICATION forming part of Letters Patent No. 484,901, dated October 25, 1892.

Application filed March 24, 1892. Serial No. 426,200. (No model.)

*To all whom it may concern:*

Be it known that we, CARL A. SCHNEIBLE, of the city, county, and State of New York, and JOSEPH SCHNEIBLE, of Brooklyn, Kings county, and State of New York, have invented certain new and useful Improvements in the Art of and Apparatus for Carbonating Liquids; and we do hereby declare that the following is a full and exact description thereof, reference being had to the accompanying drawings, and to the letters of reference marked thereon, making a part of this specification.

In Letters Patent of the United States granted to us May 10, 1892, and numbered, respectively, 474,413 and 474,414, we have described certain improvements in the carbonating of liquids whereby the liquid becomes more heavily charged than heretofore under a given pressure and a more thorough and permanent mixture of the gas with the liquid takes place.

The object of our present invention is to improve still further the method and the apparatus previously described and adapt them for the use of brewers and others by whom large quantities of ruh-beer or other still liquids are to be carbonated.

Particularly are our present improvements applicable to the carbonating of ruh-beer, ale, cider, and other fermented and non-fermented still liquids for beverages which require to be clarified as well as carbonated.

Our invention consists in the method hereinafter described and claimed whereby such liquids are more quickly and easily brought to the condition in which they may be put upon the market and the product itself is improved and in certain features of construction of the apparatus by which we have found it convenient to carry our method into effect.

In the accompanying drawings, Figure 1 is a diagrammatic view illustrating our method and an apparatus in which it may be practiced. Fig. 2 is a front view of a portion of the apparatus wherein certain of our improvements reside, and Fig. 3 is a transverse vertical section of the same.

In the apparatus shown in the drawings the ruh-beer or other still liquid to be charged is supplied under the requisite pressure through a pipe A, and is passed through a coil B within an ordinary cooling-tank C. Thence it passes to and through a filter D, which also may be of any desired construction, though we prefer to employ that style which is known in the trade as a "filter-press," since it operates not only to remove the particles of solid matter from the liquid, but also as a pressure reducing and regulating device to regulate and control the pressure upon the liquid at the time of the mixture of the gas therewith in the manner essential to the proper charging of the liquid, as pointed out in our said applications. From the filter the liquid is conducted by a pipe E to the point where the gas is introduced. In our said applications we have shown a single liquid-supply pipe and a single gas-supply pipe communicating therewith, and under ordinary circumstances such arrangement is effective. Where, however, large quantities of liquid are to be carbonated, a single stream of gas introduced into a body of liquid flowing through a large pipe would not be brought into such intimate mixture with the liquid as to be productive of the best results, even if the volume of gas were increased to correspond to the volume of the liquid. Therefore we divide the volume of liquid as it flows through the system of pipes, and into each part we introduce the proper relative volume of gas, so that the requisite intimacy of the mixture may be secured. Accordingly we connect to the main liquid-supply pipe E a series of branch pipes *e e* of such relative diameter that their aggregate area in cross-section shall be substantially equal to the area in cross-section of the main supply-pipe. The gas-supply pipe F, which furnishes the gas from any source under the proper pressure to produce a substantial equality of pressure on the gas and liquid at the point of mixture, also has connected thereto a similar series of branch pipes *f f*. The pipes *f f* are coupled to the pipes *e e* at the point G, and are there provided with suitable inlets to introduce the gas into the denser liquid as it flows through said pipes *e e*. Since it is of great importance that the substantial equality of pressure at the point of mixture be maintained, as pointed out in our said patents, we find it very desirable to provide for each pair of branch pipes an independent pressure regulator or governor H, of the general construction shown in our patent No. 474,414. Therefore each branch pipe $f$ communicates with the upper chamber of such a governor, while the lower chamber is connected through its own stem $h$ either with the branch $e$ or with the main pipe E near the junction of the pipe $e$ therewith. From the point G the charged liquid flows through a mixing-coil K to its point of union with the common delivery-pipe L, by which it is conducted to the receiving-tank M. The latter is a closed vessel, and is provided with a blow-off cock or safety-valve $m$, so that pressure may be maintained without diminution upon the charged liquid, as pointed out in our said patent No. 474,413, while at the same time the back-pressure is not increased to such a degree as to check the operation.

Each pair of pipes $e$ $f$ is provided with a set of stop-cocks 1, 2, and 3, and each coil K with a cock 4. By closing the cocks 2 2, opening the cocks 1 1 to permit the liquid to exert its pressure upon the diaphragms of the governors, and opening the cocks 3 and 4 the initial pressure may be established throughout the system of pipes and receiving-tank, which is essential to the proper conduct of the operation, as pointed out in our said patent No. 474,413. By then opening the cocks 2 2 the operation will proceed continuously. By providing a suitable connection to a supply of compressed air and manipulating the cocks properly this essential initial pressure may be established by compressed air as well as by gas. If desired, the cocks 1 1 may be closed after the initial pressure is established, and the operation will then continue steadily without being subject to the slight and temporary vibrations of the diaphragms occasioned by slight variations in the pressure on the liquid, as when a pump is employed to force the liquid through the system.

In carbonating any kind of liquid we prefer to reduce the temperature of the liquid to a low degree before introducing the gas, in order to facilitate and increase the absorption of the gas; but in treating beer or any other liquid containing more or less albumen we cool the liquid to such a degree as to congeal the albumen therein, and while the liquid is at the low temperature we force it through the filter-press and immediately thereafter introduce the gas, thoroughly incorporating it with the liquid. By this process we produce at once a lively sparkling liquid and avoid altogether the reintroduction of albuminous matter and the long storage and much handling of the liquid, which add very much to the cost of production and are incident to the subjection of the liquid to a second fermentation. The charging before filtration which is sometimes practiced largely defeats its own object, for the reason that in the process of filtering the gas is to a greater or less extent separated from the liquid.

Our method is superior to all those known to us in that starting with the liquid after its first fermentation (in the case of beer) and while it is devoid of carbonic-acid gas, we can both clarify it and charge it to the full extent in one continuous operation, thereby avoiding the long storage and the repeated handling, and at the same time producing a better article.

We claim as our invention—

1. The herein-described method of treating liquids poor in or wholly devoid of carbonic-acid gas, which consists in supplying the liquid to be treated under pressure, cooling it, filtering the cooled liquid and regulating the pressure thereon, introducing gas into and incorporating it with the cooled and filtered liquid without agitation, and maintaining pressure upon the charged liquid, substantially as described.

2. In an apparatus for treating liquids for beverages, the combination of a main liquid-supply pipe, a series of branch pipes connected thereto and adapted to divide the volume of liquid carried by the supply-pipe, a gas-supply pipe communicating with each branch pipe, a common delivery-pipe connected to said branch pipes, and a closed receiving-tank having a blow-off valve, substantially as described.

3. In an apparatus for treating liquids for beverages, the combination of a main liquid-supply pipe, a series of branch pipes connected thereto and adapted to divide the volume of liquid carried by the supply-pipe, a gas-supply pipe communicating with each branch pipe, an independent pressure regulator or governor for each branch pipe and adapted to regulate the supply of gas to each branch pipe, a common delivery-pipe, and a closed receiving-tank having a blow-off valve, substantially as described.

4. In an apparatus for treating liquids for beverages, the combination of a cooler, a filter connected thereto, a pipe for conducting the liquid from the filter, a series of branch pipes connected with said pipe, a gas-supply pipe communicating with each branch pipe, a common delivery-pipe, and a closed receiving-tank having a blow-off cock, substantially as described.

In testimony whereof we have signed our names to this specification in the presence of two subscribing witnesses.

CARL A. SCHNEIBLE.
    JOSEPH SCHNEIBLE.

Witnesses:
 A. N. JESBERA,
 A. WIDDER.